(No Model.) 3 Sheets—Sheet 2.

F. T. WEIDAW & W. E. KANE.
FILTER.

No. 422,357. Patented Feb. 25, 1890.

Witnesses
N. P. Denison
Frank D. Emmy

William E. Kane } Inventors
Frank T. Weidaw

By their Attorneys
Smith & Denison (No Model.) 3 Sheets—Sheet 3.

F. T. WEIDAW & W. E. KANE.
FILTER.

No. 422,357. Patented Feb. 25, 1890.

Witnesses.
H. P. Denison
F. T. Denison

Inventors
Frank T. Weidaw &
William E. Kane
By their Attorneys
Smith & Denison

UNITED STATES PATENT OFFICE.

FRANK T. WEIDAW AND WILLIAM E. KANE, OF SYRACUSE, ASSIGNORS OF ONE-THIRD TO WILLIAM F. MORRIS, OF BALDWINSVILLE, NEW YORK.

FILTER.

SPECIFICATION forming part of Letters Patent No. 422,357, dated February 25, 1890.

Application filed April 17, 1889. Serial No. 307,557. (No model.)

*To all whom it may concern:*

Be it known that we, FRANK T. WEIDAW and WILLIAM E. KANE, of Syracuse, county of Onondaga, in the State of New York, citizens of the United States, have invented certain new and useful Improvements in Filters, of which the following is a specification, reference being had to the accompanying drawings, in which—

Figure 1:
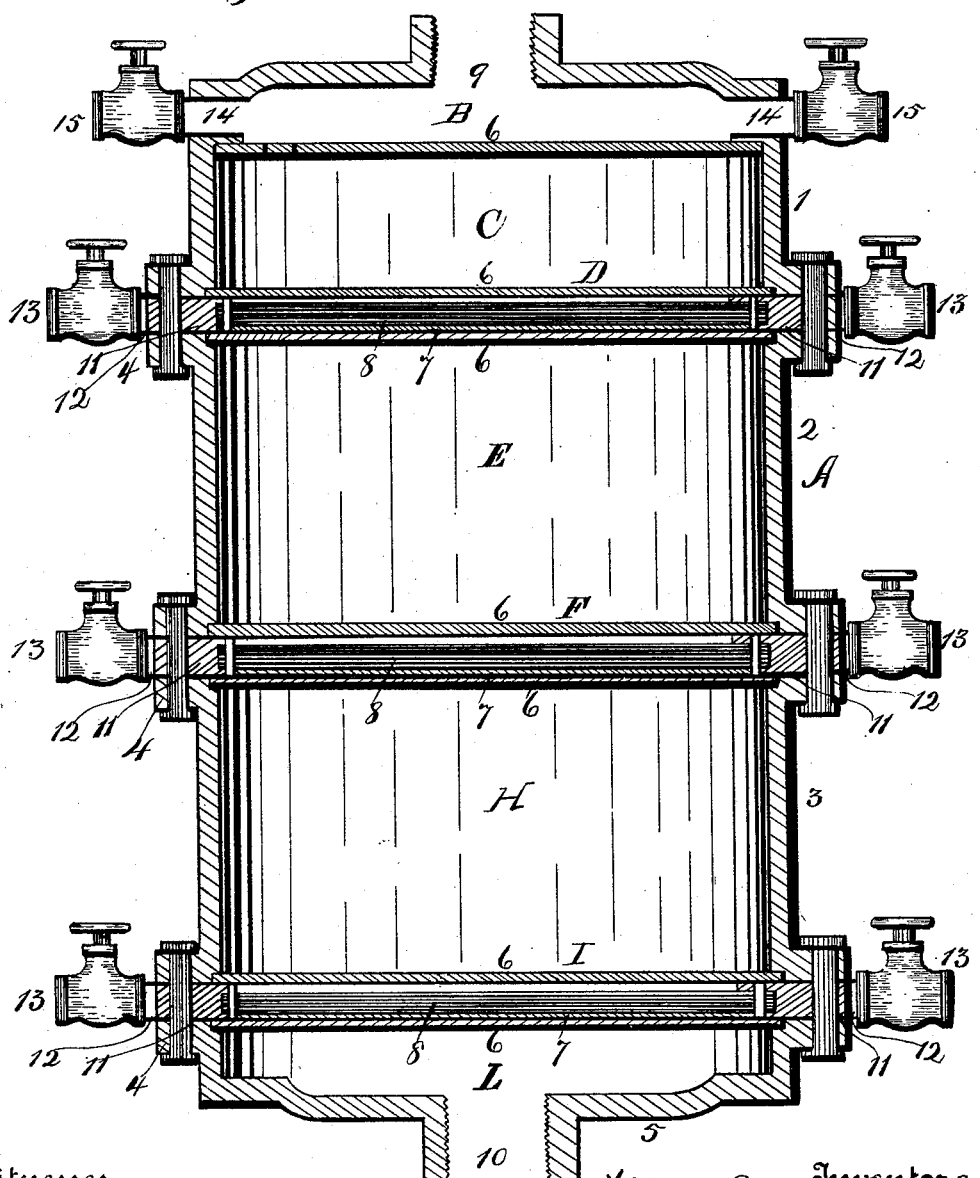
Figure 2:
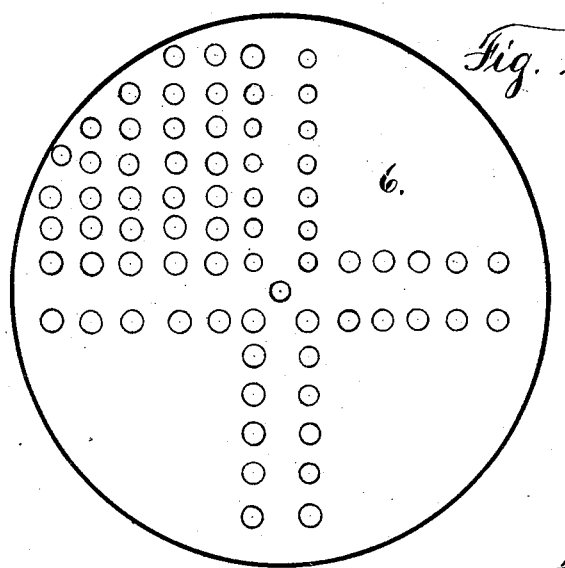
Figure 3:
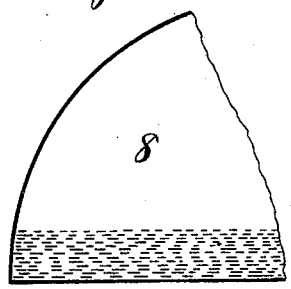
Figure 4:
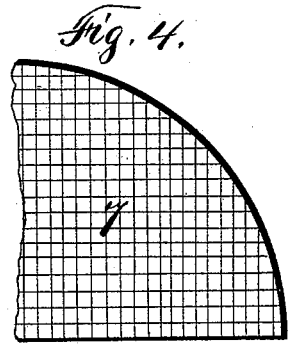
Figure 5:
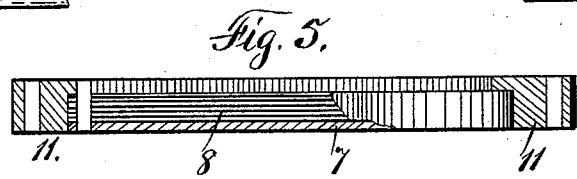
Figure 6:
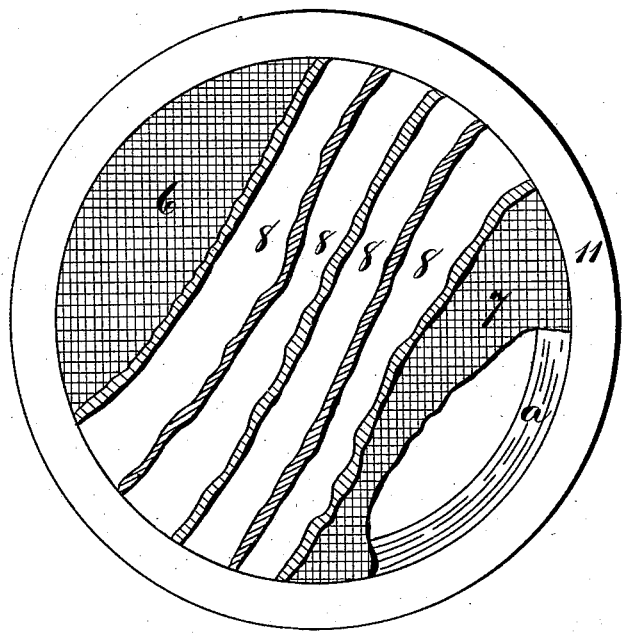
Figure 7:
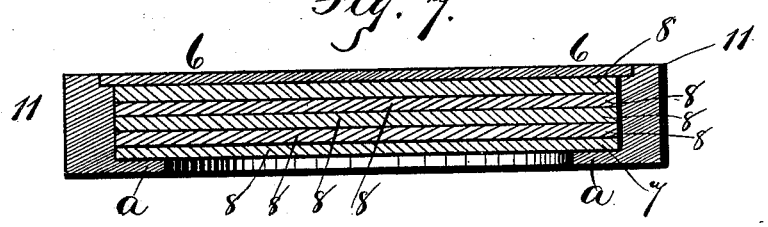

Figure 1 is a vertical longitudinal section. Fig. 2 is a plan view of a perforated diaphragm, showing the perforations enlarged. Fig. 3 is a plan view of a part of one of the layers of felt. Fig. 4 is a plan view of a part of the grating supporting the felt. Fig. 5 is a vertical transverse section of one of the rings carrying the filtering medium, broken away in part. Fig. 6 is a top plan view of the removable ring, showing the different layers successively broken away, and also showing the flange upon the ring. Fig. 7 is a vertical diametrical section of the ring, omitting pipe-connections to the edges.

Our invention relates to the construction of filters and filtering apparatus designed not only for household purposes, but as well also for filtering water for boiler-feed and other analogous purposes, either with or without the use of chemical precipitants, and also to perform filtration of either hot or cold water, and especially to that class where the liquid is made to pass through a series of filtering-diaphragms separated by chambers containing filtering material.

Our object is to provide efficient means for filtration or combined filtration to remove the precipitated impurities as well as other impurities, and also to provide means for thoroughly washing and cleaning the chambers and the filtering-diaphragms, and also to provide a filtering material composed of multiple laminæ or sheets of felt or other analogous material inclosed between perforated diaphragms in such a manner that any diaphragm can be removed without disturbing the others, and so that the layers or laminæ of felt can be removed and shifted in their relations to each other and replaced.

Our invention consists in the several novel features of construction and of operation hereinafter described, and specifically set forth in the claims annexed.

It is constructed as follows: A represents the filter, composed of the sections 1 2 3, which are secured together by an ordinary gasket, packing-joint 4, and bolts through the flanges of the filter-section, substantially as shown. The bottom 5 is secured to the sections 3 in the same manner.

At 6 we show perforated diaphragms mounted transversely to the body of the filter and secured in any ordinary manner, and upon each of the lower diaphragms 6 we place a wire-cloth grating 7, and upon each grating we place multiple layers or laminæ of felt or analogous material 8, and these are held against displacement in any ordinary manner, and are so inserted that, for illustration, the top sheet can be removed and turned over, or removed with the second sheet and replaced with the second sheet on top of the first, and so on through a multitude of changes, in such manner that any sheet can be made to perform the functions of the top sheet or bottom sheet or intermediate sheet.

The top of the filter is arched, and is provided with a coupling for the inlet-pipe, as at 9, opening into the chambers B above the upper diaphragm 6, which is purely a water-chamber, and from thence the water passes into the chamber C, which may or may not contain filtering material, and thence through the filtering-diaphragm D into the chamber E, which may or may not contain filtering material, and if filtering material is used in this chamber it may be either pure silex or gravel, or gravel and charcoal mixed, or animal charcoal.

From the chamber E the water passes through the felted diaphragm F into the chamber H, which may or may not contain filtering material, and if filtering material is used therein we can use any of the substances singly or in compound, as we have stated in regard to chamber E. From the chamber H the water passes through the felted diaphragm I into the bottom chamber L, which is purely a water-chamber, and thence it escapes through the outlet-pipe 10. Between each pair of filter-sections we interpose a felt-holder 11, consisting of a metallic ring provided with an inward flange or flanges *a*, and which flange supports the lower grating 7 and the layers of felt 8, all fitting removably but closely within the ring. We also show in the drawings the upper wire grating supported in a rabbet upon the inner edge of the ring on top. The perforated diaphragms 6 fit into rabbets in the filter-sections and are there secured, and the perforations in these diaphragms should be fine enough to prevent the passage of the filtering material through them with the liquid onto the felt, and these diaphragms are secured in their rabbets. Furthermore, each of these rings 11 is perforated, so as to receive a pipe 12, onto which a valve 13 is screwed in any ordinary manner, and these valves may be mounted on one or more sides of the filter, and are to be used in washing of the top layer of felt, or for deflecting the water from any chamber to any point for use where a partial filtration is only desired; or they can be connected to water-supply pipe, so that any chamber can be washed reversely or all of them simultaneously and in a reverse manner. The chamber B is provided with an outlet pipe or pipes leading to a valve or valves 15, so that when the current of liquid is reversed upward through the filter, if it is carried clear up through, it will be discharged through one or both of the valves 15.

It will be observed that by loosening any joint 4 by removing the bolts or fastenings and properly supporting that part of the filter above it any ring 11 carrying with it the grating 7 and felt 8 can be withdrawn toward the front for the purpose of changing the layers of felt or turning them over or shifting their position with relation to each other, and can be replaced, the bolts inserted, and the joint made tight without disturbing the other sections or taking the filter down to the diaphragm or felt to be changed. It will also be observed that while for most purposes we can use silex or gravel or gravel and wood-charcoal in the chambers C and E, yet it is preferable, to say the least, when the water is to be used for household purposes, to use animal charcoal in the chamber H. It will also be observed that the diaphragms D and F and chamber E will remove thoroughly all precipitated impurities, such as carbonates and chlorides, and that then the chamber H may be used as an auxiliary reservoir in connection with the chamber L for storage. It will be further observed that the felted diaphragm D can be used for the removal of sediment from the water, and that then the chemicals used as precipitants can be injected through the valve and pipe adjacent to the diaphragm F into the chamber E, or through the bottom valve 13 into the chamber H, for the removal of the carbonates and chlorides when the water is to be used in boilers.

What we claim is—

1. A filter consisting of sections, rabbets upon the inner edge of their open ends, a perforated diaphragm secured in each rabbet, a removable ring interposed between the sections and flanged inwardly, wire gratings resting upon or against the flanges, interchangeable layers of filtering material between the gratings, pipes provided with valves connected with the outer edge of the ring and communicating through it with the interior of the filter, and means for detachably securing the sections and ring together.

2. The combination, with the filter-sections, of a ring removably secured between them, consisting of a rim flanged inwardly, sheets of wire grating supported by the flanges, and interchangeable thin layers of felt between the gratings and within the ring.

In witness whereof we have hereunto set our hands this 4th day of April, 1889.

FRANK T. WEIDAW.
    WILLIAM E. KANE.

In presence of—
 H. P. DENISON,
 C. W. SMITH.